United States Patent [19]
von Flue

[11] Patent Number: 4,676,410
[45] Date of Patent: Jun. 30, 1987

[54] DEVICE FOR DISPENSING THE CONTENTS OF CARTRIDGES

[75] Inventor: Peter von Flue, Mauren, Liechtenstein

[73] Assignee: Hilti Aktiengesellschaft, Fürstentum, Liechtenstein

[21] Appl. No.: 852,137

[22] Filed: Apr. 15, 1986

[30] Foreign Application Priority Data

Apr. 20, 1985 [DE] Fed. Rep. of Germany ....... 3514428

[51] Int. Cl.⁴ .................. B67D 5/46; B67D 5/54; F16B 21/00
[52] U.S. Cl. .................. 222/327; 222/389; 222/137; 403/315; 403/324
[58] Field of Search ............... 222/135–137, 222/145, 258, 259, 261, 262, 263, 326, 327, 389; 285/302; 403/315–317, 324

[56] References Cited

U.S. PATENT DOCUMENTS

| 302,519 | 7/1884 | Parsons | 403/324 X |
| 353,218 | 11/1886 | Harrington | 403/324 X |
| 1,404,260 | 1/1922 | Arnold | 403/324 |
| 1,648,163 | 11/1927 | Childs | 222/389 X |
| 2,351,688 | 6/1944 | Lee | 222/327 |
| 2,943,768 | 7/1960 | Lindsay | 222/327 |
| 2,997,320 | 8/1961 | Sutherland | 403/316 |
| 3,311,265 | 3/1967 | Creighton, Jr. et al. | 222/327 X |
| 3,983,947 | 10/1976 | Wills et al. | 222/389 X |

FOREIGN PATENT DOCUMENTS

| 3048520 | 7/1982 | Fed. Rep. of Germany . | |
| 509467 | 8/1976 | U.S.S.R. | 403/324 |

Primary Examiner—Joseph J. Rolla
Assistant Examiner—Kevin P. Shaver
Attorney, Agent, or Firm—Toren, McGeady & Associates

[57] ABSTRACT

In a device for the controlled dispensation of plastic substances from cartridges, the cartridges are mounted in a pressure support removably secured to one end of a hollow cylinder. A piston is slidably displaceable through the cylinder by a pressure medium and, in turn, the piston displaces a pusher rod extending into the pressure support for dispensing the plastic substances. The pressure support is releasably secured to the cylinder by an eccentric shaft located in the one end of the cylinder. By releasing the pressure support, cartridges can be replaced and the piston and the piston rod returned to the starting position.

8 Claims, 3 Drawing Figures

U.S. Patent  Jun. 30, 1987  4,676,410
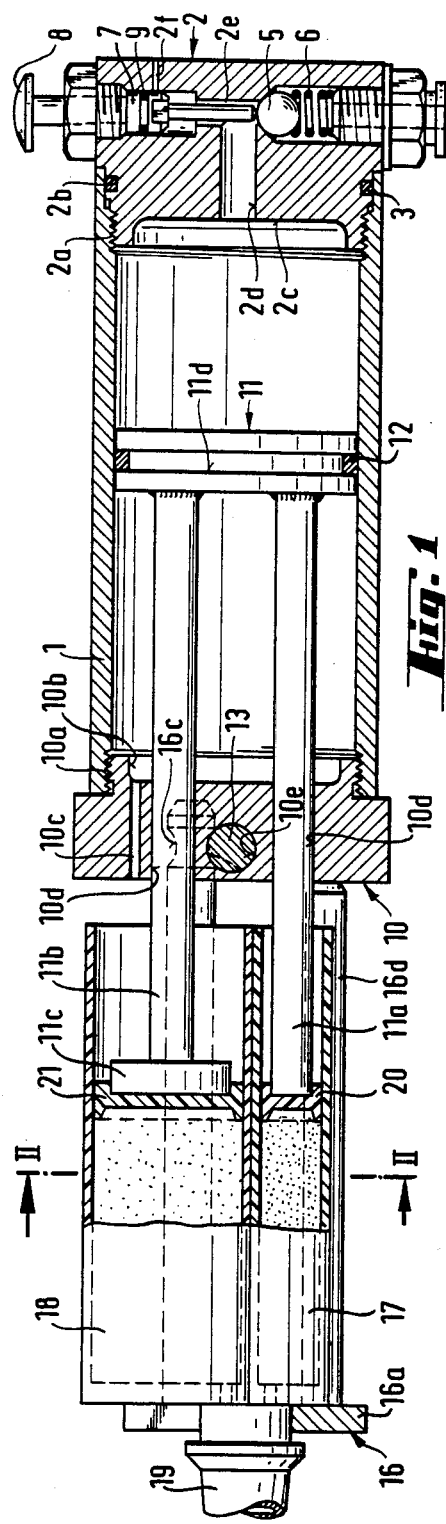
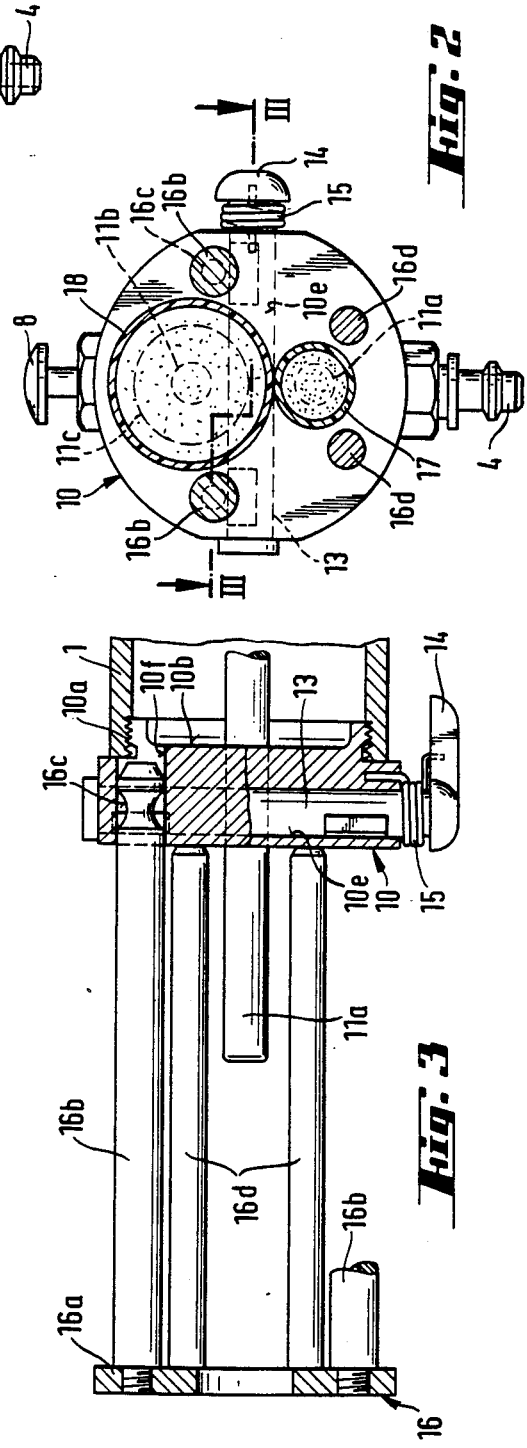

DEVICE FOR DISPENSING THE CONTENTS OF CARTRIDGES

BACKGROUND OF THE INVENTION

The present invention is directed to a device for the controlled dispensation of a plastic mass or substance out of cartridges. The device includes a hollow cylinder containing a piston slidably displaceable through the cylinder with a pusher rod secured to the piston and means for driving the piston and pusher rod by a pressure medium in the cylinder. A pressure support mounts the cartridges on one end of the cylinder.

Devices of the above-mentioned type are generally used in the construction industry for filling-in gaps and cracks, or for bonding or anchoring fastening elements in boreholes formed in a receiving structure. Accordingly, a plastic material formed of a single or multi-componenet system is used which is hardenable or remains in the elastic state after being dispensed.

In most of the previously known devices for dispensing such substances, the dispensing force is supplied manually through a mechanism actuated by a lever or handle. When such substances are dispensed at low temperatures they can have a high viscosity such that the force required to dispense the substance can not be provided manually. This characteristic provides a considerable disadvantage if fastening elements of large dimensions are to be anchored and large amounts of the anchoring substance are required. Accordingly, it has been known to provide such devices where the driving force is supplied by an external source. Generally, compressed air has been used as the external source, since it is not a dangerous substance and often is available at construction sites.

In manually operated devices as well as those operated by an external source, the pusher rod effecting the displacement of the substance out of the cartridge must be retracted into its original starting position to replace the cartridge. Such replacement does not afford any significant problem in manually operated devices, since the pusher rods are arranged so that they project rearwardly from the housing in which the drive mechanism is positioned even when the pusher rod is displaced through the cartridges. After a stop member for the pusher rod is released, the pusher rods can be pulled rearwardly into the original starting position. If the dispensing device utilizes an external source of energy, the return of the pusher rods into the starting position is considerably more complicated. In one known dispensing device, the pusher rods are not directly accessible from the side. As a result, special tools are required for returning the pusher rods to the starting position.

In another known dispensing device, the piston can be moved by the pressure medium in the dispensing direction as well as in the opposite direction. Such an arrangement, however, requires additional connecting lines and a complicated reversing valve. Accordingly, such a device is more expensive and more prone to malfunction.

SUMMARY OF THE INVENTION

Therefore, it is the primary object of the present invention to provide a device for dispensing plastic substances out of cartridges where an external energy source is used for effecting the dispensation and where the pusher rod can be returned to its starting position without any complicated means.

In accordance with the present invention, a pressure or counterpressure support is detachably connected to the device.

Due to the detachable connection of the pressure support with the device, it is possible to remove the pressure support alone or together with the empty cartridge from the device. The pusher rod effecting the movement of the dispensing piston within the cartridge can be retracted by hand, without any additional means, into its starting position with the simultaneous venting of the pressure medium space in the cylinder. Depending on the design, the pressure support alone can be connected with the device and subsequently a new cartridge can be inserted into the pressure support or the new cartridge can be introduced into the pressure support and then the combination of the two parts can be connected to the device.

In use, it is seldom possible to determine when a cartridge will be empty and need replacement. Accordingly, it may happen that the cartridge becomes empty in the middle of a working operation and must be replaced. To afford uniform quality of work, the replacement of the cartridge must take place as quickly as possible. Therefore, it is appropriate to connect the pressure support with the device by a detent lock. A detent lock has the advantage, as compared with a thread, that as a rule no special tool is required for releasing the lock. A detent lock can transmit relatively high forces and can be formed in a relatively simple manner.

Advantageously, the detent lock is formed as a detent element automatically insertable into a recess in a part of the pressure support with the lock being releasable by an actuating member. The release of the connection between the pressure support and the housing of the device is possible only by external operation of the actuating member. The force required for operating the actuating member can be small.

To provide a compact construction of the dispensing device, the space requirements are limited. To afford a secure connection in spite of this consideration, the detent element is provided in the form of an eccentric shaft. The eccentricity of the shaft can be arranged so that the detent lock tightens under load and can not open by itself. Further, an eccentric shaft is very simple as far as actuation is concerned, since the actuating member for releasing the locking action can be incorporated as a part of the eccentric shaft.

In another embodiment, the detent element can be in the form of a lock bolt. Such a lock bolt can be displaceably supported in a bore and biased into the applied position by a spring located within the bore.

To connect the pressure support with the device usually two hands are required with one hand holding the device and the other hand holding the pressure support to be connected to the device. To afford the connection without any additional means, it is appropriate that the detent element releases itself when the pressure support is inserted into the device. Such release of the detent element can be effected by means of a run-in bevel formed on the pressure support. Subsequently, the detent element automatically returns into the locking position in a recess in the pressure support. The completion of the locking action can be heard and felt by the operator.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending side view, partly in section, of the device embodying the present invention;

FIG. 2 is a cross-sectional view through the device shown in FIG. 1 taken along the line II—II; and FIG. 3 is a partial axially extending sectional view of the device illustrated in FIGS. 1 and 2 and taken along the line III—III in FIG. 2.

DETAILED DESCRIPTION OF THE INVENTION

In FIG. 1 a device for dispensing single component or multi-component plastic substances from cartridges is illustrated. In FIGS. 1, 2 and 3 the device is made up of an axially elongated hollow cylinder 1 with a pair of opposite ends spaced apart in the axial direction. The first or right-hand end mounts a valve block 2. One end of the valve block 2 is secured by means of a thread 2a within the inside surface of the cylinder 1 adjacent its first end. Adjacent the thread 2a is an annular groove 2b extending around the valve block 2 and containing a seal bearing against the inside surface of the cylinder just inwardly of its first end. The end of the valve block 2 located within the cylinder 1 has a recess 2c. A centrally arranged bore 2d extending in the axial direction of the cylinder 1 extends from the recess 2c for a portion of the axial length of the valve block 2. At the opposite end of the bore 2d a valve bore 2e is provided extending diametrically across the valve block 2 and spaced inwardly from the end of the valve block spaced outwardly from the first end of the cylinder 1 The valve bore 2e extends perpendicularly of the bore 2d. A fitting 4 is threaded into one end of the valve bore 2e. The valve bore 2e is made up of several different bore sections of different diameters. The bore section of valve bore 2e containing the fitting 4 has a larger diameter until it approaches the bore 2d where it necks down and forms a valve seat. A ball 5 is located in the larger diameter section and is biased against the valve seat by a pressure spring 6. In the bore section on the opposite side of the valve block 2 from the fitting 4, there is a valve slide 7 with the end of the valve slide in contact with the ball 5 as shown in FIG. 1, but not displacing the ball from the valve seat. At the end of the valve slide 7 extending out of the valve block 2 there is a pusher knob 8. By pressing the knob inwardly toward the valve block 2 the valve slide is displaced through the valve bore 2e toward the fitting 4 and presses against the ball 5 opposite to the biasing force of the pressure spring 6 so that the ball 5 can be displaced from the valve seat. In the bore section of the valve bore 2e containing the valve slide 7 there is a sealing ring 9 bearing against the inside surface of the valve bore for effecting a sealing action.

The opposite second end of the cylinder 1 has an end piece 10 inserted into it with a thread 10a on the end piece connecting it with the cylinder 1. End piece 10 has a recess 10b in its face directed toward the valve block 2. A vent hole 10c extends through the end piece 10 parallel with the axial direction of the cylinder 1 and open to the ambient atmosphere about the device so that the vent hole can discharge air from the recess 10b to the atmosphere. A piston 11 is slidably displaceably supported within the cylinder 1 so that it can move in the direction between the first and second ends with the movement of the piston toward the second end affording the dispensing action of the device. Piston 11 includes two piston or pusher rods 11a, 11b each extending parallel to the other and parallel to the axial direction of the cylinder. Pusher rods 11a and 11b are guided within guide bores 10d extending through the end piece 10 so that the pusher rods project axially outwardly from the end piece. At its end outside the cylinder 1, pusher rod 11b has a head 11c of greater diameter than the diameter of the rod itself. An annular groove 11d is formed around the axially extending circumferential side of the piston 11 and a piston ring 23 is located within the groove for effecting a sealing action between the piston and the inside surface of the cylinder 1. An eccentric shaft 13 is rotatably mounted in a bore 10e extending diametrically completely across the end piece 10. The bore 10e extends perpendicularly of the axial direction of the cylinder 1 and is spaced between the guide bores 10d. As can be seen in FIGS. 2 and 3, the eccentric shaft 13 has a lever 14 at one end located outwardly from the end piece 10 and a spring 15 is connected to the end piece 10 and the lever 14 so that the shaft is biased into a specific position.

A pressure or counterpressure support or holder 16 is detachably connected to the device at the second end of the cylinder 1. The pressure support 16 extends axially outwardly from the end piece 10 and is made up of a plate 16a extending transversely of the axial direction of the cylinder with two tension rods 16b connected to the plate 16a and extending to the end piece 10. The free ends of the tension rods 16b, that is, the ends spaced axially from the plate 16, each form a detent groove 16c extending circumferentially around the rod. In addition, a pair of pressure rods 16d extend between the plate 16a and the facing surface of the end piece 10 in the manner of spacers. The positional relation of the tension rods 16b and the pressure rods 16d can be noted in FIGS. 2 and 3. Tension rods 16b extend into detent bores 10f located within the end piece 10 with the axes of the bores being parallel with the axis of the cylinder. The tension rods 16b are secured in the end piece 10 within the detent bores 10f by the eccentric shaft 13. The eccentric character of the shaft 13 is provided by the eccentric recesses formed in the shaft with each recess associated with one of the detent bores 10f.

In FIGS. 1 and 2, cartridges 17, 18 are provided each containing one component of a multi-component mass or substance. The cartridges are mounted in parallel relation to one another within the pressure support 16. At the end of the pressure support spaced from the end piece 10, that is, at the plate 16a, a mouthpiece or outlet member 19 is provided for combining the components within the cartridges 17, 18 when the components are dispensed or pressed out of the cartridges. Each cartridge 17, 18 contains a pressing-out piston 20, 21 which are axially displaceable through the cartridges by the pressing action afforded by the pusher rods 11a, 11b axially aligned with the cartridges.

To dispense the substances or components out of the cartridges, the pressure knob 8 is pressed inwardly. The inward movement of the pressure knob displaces the slide valve 7 against the ball 5 moving the ball toward the fitting 4 opposite to the force provided by the spring 6. Accordingly, the valve is opened and the pressure medium supplied through the fitting 4 flows into the space in the cylinder 1 through the bore 2d and the recess 2c so that the pressure medium contacts the surface of the piston 11 facing toward the valve block 2. As a result, pressure builds up within the space in the cylinder 1 between the piston 11 and the valve block 2. The force developed as a result of the pressure of the pressure medium and the crosssectional surface of the piston 11 acts on the piston displacing it and the pusher rods 11a, 11b against the pressing-out pistons 20, 21 associated with the cartridges 17, 18. The pressing-out pistons 20, 21 are displaced toward the plate 16a and the components within the cartridges are dispensed through the mouthpiece 19 until the pressure developed within the cylinder is reduced or balanced. The vent bore 10c in the end piece 10 prevents an air cushion from developing on the side of the piston 11 facing toward the end piece 10. If the piston 11 reaches its end position limited by the end piece 10, cartridges 17, 18 have been completely emptied and must be replaced. For such replacement, the eccentric shaft 13 is rotated about its axis by the lever 14. This rotational displacement moves the eccentric recesses in the shaft 13 into the region of the ends of the tension rods 16b containing the detent grooves 16c. As a result, the locking action is released and the pressure support 16 can be pulled out in the axial direction away from the end member 10 carrying with it the cartridges 17, 18. With the removal of the pressure support 16, the pusher rods 11a, 11b projecting outwardly from the end piece 10 can be pushed back into the cylinder into the starting position for dispensing the substance. To afford the movement of the piston 11 toward the valve block 2, the valve slide 7 is arranged, when the pusher knob 8 is twisted or turned about the axis of the valve slide so that a vent opening 2f is provided between the valve bore 2e and the ambient atmosphere. As a result, any air located between the piston 11 and the valve block 2 can flow through the recess 2c, the axial bore 2d into the valve bore 2e and out through the vent 2f to the atmosphere. After fresh cartridges 17, 18 have been placed in the pressure support 16, the pressure support is reconnected to the device by placing the free ends of the tension rods 16b into the detent bores 10f. The insertion of the tension rods 16b causes the eccentric shaft 13 to be turned due to the bevelled end faces on the free ends of the tension rods until the eccentric shaft can snap into the detent grooves 16c in the tension rods. The action of the spring 15 biases the eccentric shaft 13 into the locking position with the ends of the tension rods 16b extending into the bores 10f in the end piece 10. Accordingly, the pressure support 16 is again connected to the end piece 10 in a positive locking manner and the controlled dispensation of the components in the cartridges 17 and 18 can be carried out.

While specific embodiments of the invention have been shown and described in detail to illustrate the application of the inventive principles, it will be understood that the invention may be embodied otherwise without departing from such principles.

I claim:

1. Device for dispensing a plastic substance out of an axially extending cylindrically shaped cartridge by displacing a piston through the cartridge in the axial direction thereof, comprising an axially extending pusher rod engageable with the dispensing piston, and a drive means for pressing said pusher rod in the axial direction thereof against the dispensing piston, said drive means comprises an axially elongated hollow cylinder having a first end and a second end spaced apart in the axial direction of said cylinder, a piston displaceable mounted in said cylinder in the direction between the first and second ends thereof, means located within the first end of said cylinder for supplying a pressure medium into said cylinder for slidably displacing said piston toward the second end of said cylinder, and an axially extending pressure support for mounting at least one cartridge on the second end of said cylinder, wherein the improvement comprises coupling means for detachably connecting said pressure support to the second end of said cylinder, said pressure support extending axially outwardly from the second end of said cylinder with the axis of said pressure support extending in a generally parallel relation with the axial direction of said cylinder, said coupling means comprising a detent lock for connecting said pressure support to the second end of said cylinder, said detent lock includes a member disposed transverse to the axial direction of the hollow cylinder, said cylinder including closure means for the second end thereof, said closure means having an outside surface accessible on the exterior of said device, and said pressure support includes rod means positionable within a bore of said closure means at the second end of said cylinder, said rod means includes a recess disposed transversely of the axial direction of said hollow cylinder and arranged to receive said member of said detent lock, and an actuating member located on the outside surface of said closure means and secured to said member for turning it about its axis thereof from a locked position into a releasing position so that said pressure support can be removed from the second end of said cylinder.

2. Device, as set forth in claim 1, wherein said member of said detent lock comprises an elongated eccentric shaft extending through said closure means in the second end of said cylinder.

3. Device, as set forth in claim 1, wherein said detent lock being displaceable into the locked position by the action of said pressure support being inserted into said bore of said closure means in the second end of said cylinder.

4. Device, for dispensing a plastic substance out of an axially cylindrically shaped cartridge by displacing a dispensing piston through the cartridge in the axial direction thereof, comprising an axially extending pusher rod engagable with the dispensing piston, and a drive means for pressing said pusher rod in the axial direction thereof against the dispensing piston, said drive means comprises an axially elongated hollow cylinder having a first end and a second end spaced apart in the axial direction of said cylinder, a piston displaceably mounted in said cylinder in the direction between the first and second ends thereof, means located within the first end of said cylinder for supplying a pressure medium into said cylinder for slidably displacing said piston toward the second end of said cylinder, and an axially extending pressure support for mounting at least one cartridge on the second end of said cylinder, wherein the improvement comprises means coupling for detachably connecting said pressure support to the second end of said cylinder, said pressure support extending axially outwardly from the second end of said cylinder with the axis of said pressure support extending in generally parallel relation with the axial direction of said cylinder, a valve block engaged in the first end of said cylinder and means in said valve block for controllably introducing a pressure medium into said cylinder between said piston and said valve block, an end piece secured into the second end of said cylinder and forming a closure thereof, said pressure support includes a pair of tension rods extending parallel with the axis of said cylinder with said tension rods having first ends and second ends with the first ends being closer to said cylinder and being received within a bore of said end piece in said cylinder, and said coupling means comprises an eccentric shaft in said end piece extending transversely of the axial direction of said cylinder and engageable with said tension rods for releasably securing said tension rods to said cylinder.

5. Device, as set forth in claim 4, wherein a vent bore is located through said end piece so that air within said cylinder between said piston and said end piece can be released to the atmosphere when said piston is displaced toward said end piece.

6. Device, as set forth in claim 4, wherein said means for supplying a pressure medium comprises passageway means in said valve block and a pressure medium from an outside source; block, and a vent bore in said valve block extending between said passageway means and the outside of said valve block so that air located between said piston and said valve block can be discharged through said passageway means and said vent bore to the atmosphere when the piston is moved through said cylinder toward said valve block.

7. Device, as set forth in claim 4, wherein a lever is secured to one end of said eccentric shaft located outwardly from said end piece so that said eccentric shaft can be rotated into a released position for removing said pressure support.

8. Device, as set forth in claim 7, wherein spring means are associated with said lever and said eccentric shaft for biasing said eccentric shaft into a locking position with said tension rods.

* * * * *